United States Patent
Wu (10) Patent No.: US 10,375,378 B2
(45) Date of Patent: Aug. 6, 2019

(54) DUAL CAMERA SYSTEM FOR REAL-TIME DEPTH MAP GENERATION

(71) Applicant: Black Sesame International Holding Limited, Santa Clara, CA (US)

(72) Inventor: Donghui Wu, San Mateo, CA (US)

(73) Assignee: Black Sesame International Holding Limited, Santa Clara, CA (US)

(*) Notice: Subject to any disclaimer, the term of this patent is extended or adjusted under 35 U.S.C. 154(b) by 0 days.

(21) Appl. No.: 16/010,179

(22) Filed: Jun. 15, 2018

(65) Prior Publication Data

US 2019/0182475 A1  Jun. 13, 2019

Related U.S. Application Data

(60) Provisional application No. 62/597,737, filed on Dec. 12, 2017.

(51) Int. Cl.
| | |
|---|---|
| H04N 13/271 | (2018.01) |
| H04N 5/232 | (2006.01) |
| G06T 7/557 | (2017.01) |
| G06T 7/593 | (2017.01) |
| G06T 5/00 | (2006.01) |

(52) U.S. Cl.
CPC .......... *H04N 13/271* (2018.05); *G06T 7/557* (2017.01); *G06T 7/593* (2017.01); *H04N 5/23212* (2013.01); *G06T 5/002* (2013.01); *G06T 2207/10012* (2013.01); *G06T 2207/10024* (2013.01); *G06T 2207/10052* (2013.01); *G06T 2207/20021* (2013.01); *G06T 2207/20216* (2013.01)

(58) Field of Classification Search
None
See application file for complete search history.

(56) References Cited

U.S. PATENT DOCUMENTS

| | | | | |
|---|---|---|---|---|
| 2010/0259597 | A1* | 10/2010 | Choi | G06K 9/00255 |
| | | | | 348/46 |
| 2016/0188994 | A1* | 6/2016 | Wu | G06T 7/593 |
| | | | | 382/195 |
| 2017/0359565 | A1* | 12/2017 | Ito | H04N 5/225 |

* cited by examiner

*Primary Examiner* — Christopher Braniff
(74) *Attorney, Agent, or Firm* — Timothy T. Wang; Ni, Wang & Massand, PLLC (57) ABSTRACT

A method of real-time depth mapping in a dual camera system, including, receiving an auto focus image, rectifying the auto focus image, receiving a plenoptic image having lens that cover 2×2 pixels, extracting four plenoptic sub-images, averaging and rectifying the plenoptic sub-images, block matching the rectified auto focus image and the rectified plenoptic sub-images along epipolar lines, block matching the rectified plenoptic sub-images along a vertical and a horizontal direction, determining a composite block matching error of the plenoptic block match, determining a plenoptic disparity map of the plenoptic sub-images based on the composite block matching error, converting the plenoptic disparity map to a plenoptic depth map, converting the plenoptic depth map to an initial stereo disparity map, searching for a guided disparity map based on the initial stereo disparity map and the epipolar block match and converting the guided disparity map to a guided depth map.

19 Claims, 7 Drawing Sheets

DUAL CAMERA SYSTEM FOR REAL-TIME DEPTH MAP GENERATION

BACKGROUND

Technical Field

The instant disclosure is related to digital photography and more specifically to camera focusing using an autofocus camera and a plenoptic camera.

Background

Real lime depth maps of surrounding environments are currently being applied in robotics and consumer electronics. Depth maps may be accomplished through the use of stereoscopic cameras and light field cameras which obtain depth maps in color.

SUMMARY

In one embodiment a method of real-time depth mapping in a dual camera system, including, receiving an auto focus image from an auto focus camera module, converting the auto focus image to monochrome, rectifying the converted auto focus image, receiving a fixed focus image from a plenoptic camera module having lens that cover 2×2 pixels and outputting a plurality of plenoptic sub-images, extracting four plenoptic sub-images from the plurality of plenoptic sub images, averaging the extracted plenoptic sub-images, rectifying the averaged plenoptic sub-images, block matching the rectified auto focus image and the rectified plenoptic sub-images along epipolar lines, outputting an epipolar block match, block matching the rectified plenoptic sub-images along a vertical direction, outputting vertical plenoptic block match, block matching the rectified plenoptic sub-images along a horizontal direction, outputting horizontal plenoptic block match, determining a composite block matching error of the vertical plenoptic block match and the horizontal plenoptic block match, determining a plenoptic disparity map of the extracted plenoptic sub-images based on the composite block matching error, converting the plenoptic disparity map to a plenoptic depth map, converting the plenoptic depth map to an initial stereo disparity map, searching for a guided disparity map based on the initial stereo disparity map and the epipolar block match and converting the guided disparity map to a guided depth map.

In another embodiment a dual camera system having real-time depth map generation, including, an auto focus camera module outputting an auto focus image, a monochromatic plenoptic camera module, wherein the plenoptic lens cover 2×2 pixels, outputting a plurality of plenoptic sub-images, wherein the plenoptic camera module is fixed focus, a processor coupled to the auto focus camera module and the plenoptic camera module, wherein the processor, converts the auto focus image to monochrome, rectifies the converted auto focus image, receives four plenoptic sub-images from the plenoptic camera module, averages four plenoptic sub-images from the fixed focus image, rectifies the averaged four plenoptic sub-images and block matches the rectified auto focus image and the rectified sub-image along epipolar lines.

In yet a further embodiment a dual camera stereo system having real-time depth map generation, including, an auto focus camera module outputting an auto focus image, a monochromatic plenoptic camera module, wherein the plenoptic lens cover 2×2 pixels and outputs a plurality of plenoptic sub-images and wherein the plenoptic camera module is fixed focus, a processor coupled to the auto focus camera module and the plenoptic camera module, wherein the processor, extracts four plenoptic sub-images from the plurality of plenoptic sub-images, block matches the four plenoptic sub-images along a vertical direction, outputting a vertical plenoptic block match, block matches the four plenoptic sub-images along a horizontal direction, outputting a horizontal plenoptic block match, determines a composite block matching error of the vertical plenoptic block match and the horizontal plenoptic block match, determines a plenoptic disparity map of the four plenoptic sub-images based on the composite block matching error, determines a plenoptic confidence map of the four plenoptic sub-images based on the composite block matching error and converts the plenoptic disparity map to a plenoptic depth map.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the an will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
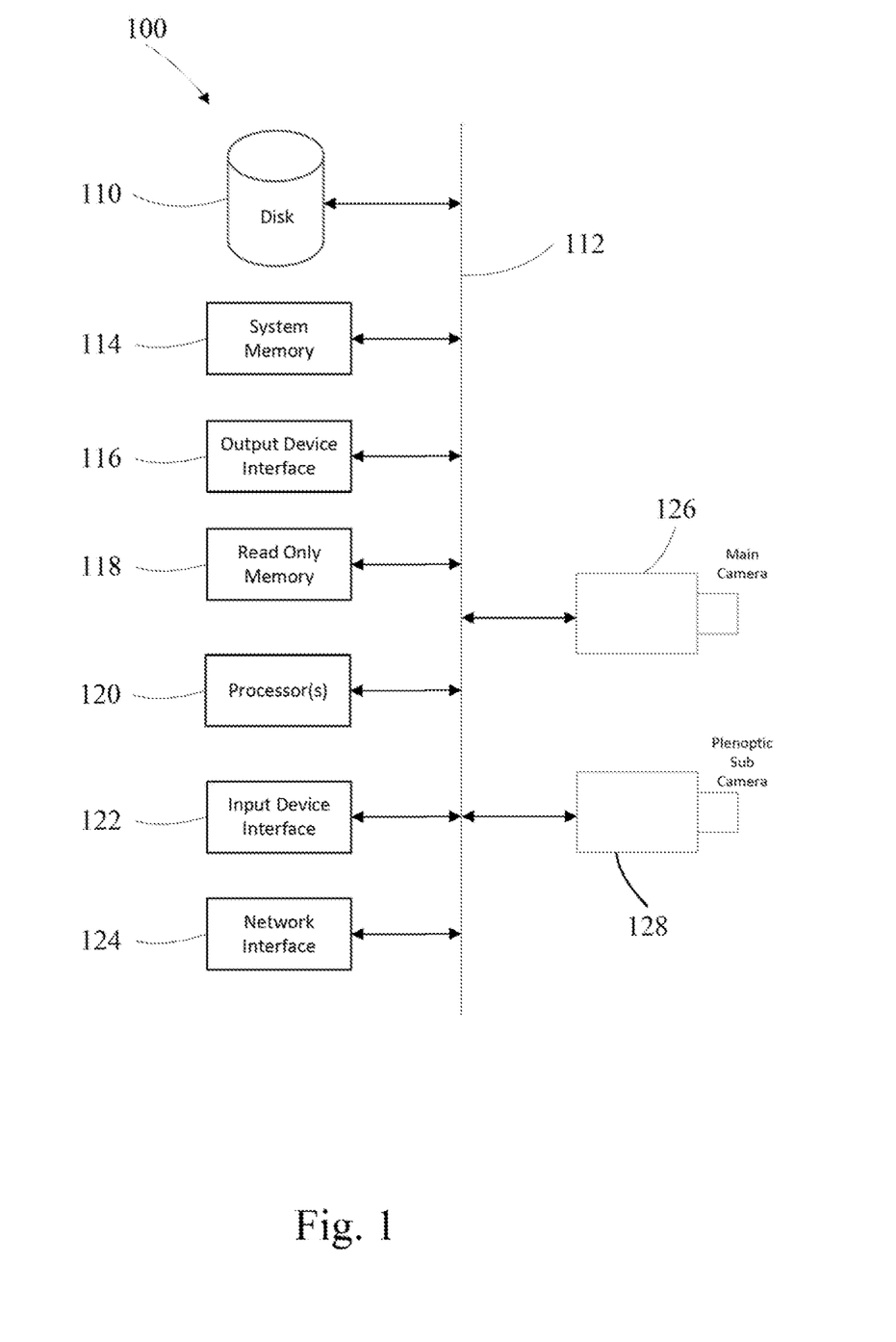
FIG. 1 is a system diagram in accordance with one embodiment of the disclosure.

FIG. 1 depicts an example electronic system for use in connection with a system having dual cameras. Electronic system 100 may be a computing device for execution of software associated with the operation of one or more portions or steps of process 600 or 700, or components and processes provided by FIGS. 6-7. Electronic system 100 may be an embedded computer, personal computer or a mobile device such as a tablet computer, laptop, smart phone, PDA, or other touch screen or television with one or more processors embedded therein or coupled thereto, or any other sort of computer-related electronic device.

Electronic system 100 may include various types of computer readable media and interfaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to the auto focus camera module sensor 126 (main camera) and the plenoptic fixed focus camera module 128 (sub camera).

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, auto focus camera module sensor 126 (main camera) and plenoptic fixed focus camera module 128 (sub camera).

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touch-screen that functions as both input and output devices.

Finally, as shown in FIG. 1, bus 112 may also couple electronic system 100 to a network (not shown) through network interfaces 124. Network interfaces 124 may include, for example, a wireless access point (e.g., Bluetooth or WiFi) or radio circuitry for connecting to a wireless access point. Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

In a manner like human binocular vision, a stereo vision system has two cameras mounted side by side horizontally having a known distance between their optical centers. Two slightly different views of a same scene may be captured by these two cameras. When a scene contains moving objects, these two cameras are synced to capture images in a near simultaneous fashion.

Figure 2:
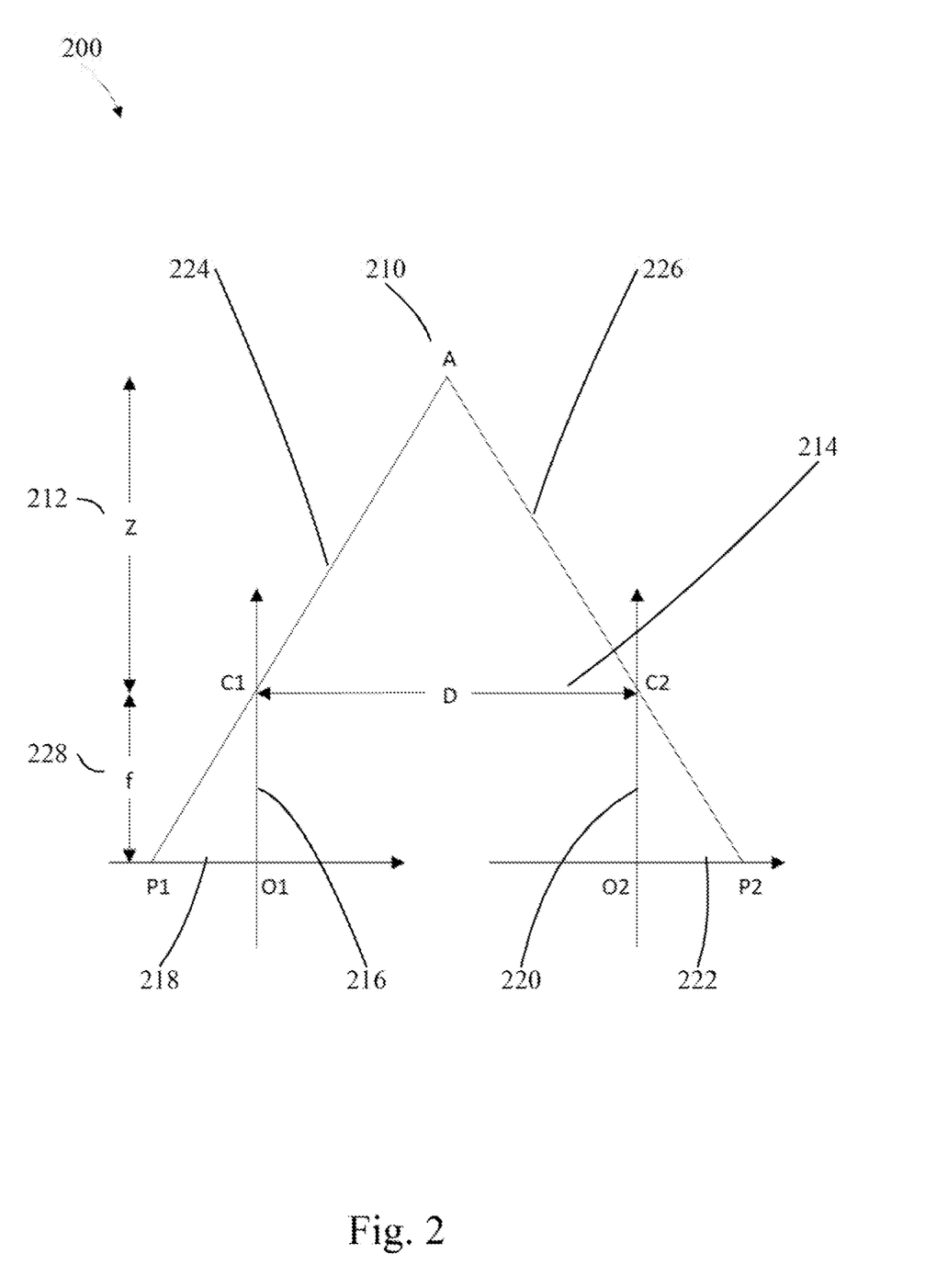
FIG. 2 is a system diagram showing a stereo vision layout in accordance with one embodiment of the disclosure.

As shown in FIG. 2, light rays 224 and 226 from object point A 210 is transmitted through an entry point of two pin-hole cameras and having two projections (P1 and P2) on an image plane. Based upon triangular similarity, the equation depicting the ratio between disparity d=(P1O1 (216, 218)+O2P2 (220, 222)) and focal length (f) 228 is equal to the ratio between optical center distance (D (214)=C1C2) and depth (Z) (212) of point A: d/f=D/Z In stereo systems, the two cameras may not be identical co-planar pin-hole cameras. Instead, a rectification algorithm is applied to the images to simulate an output as if the images were captured by two identical co-planar pin-hole cameras. This step includes both linear and non-linear transformations. The parameters of these transformations are often calibrated in an offline calibration step, in which a controlled scene is captured by the system. To recover depth from the disparity, the focal length (f) and camera distance (D) are needed, which may also be calibrated in the offline calibration step.

To compute the disparity, identification that the pixel pair are from the same object point is found by comparing their image similarities. For a pixel in left image, multiple pixels in the right image may have same image similarity, which may cause mismatching.

Figure 3:
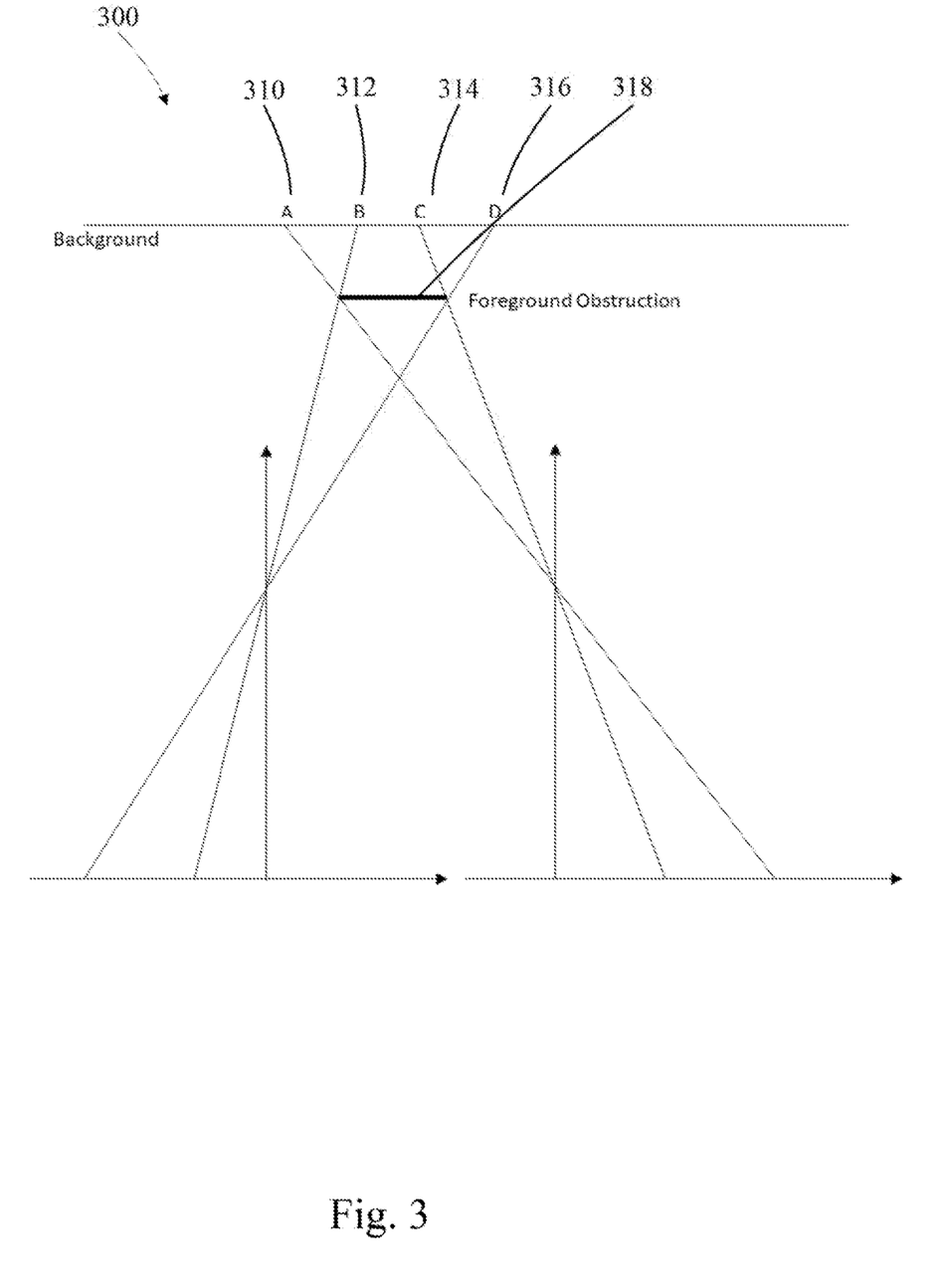
FIG. 3 is a depiction of occlusion in a stereo vision layout in accordance with one embodiment of the disclosure.

Another problem of stereo vision is occlusion. As shown in FIG. 3, a part of background (AB) 310, 312 visible in left image may be blocked by the foreground obstruction 318 in the right image. Another part of background (CD) 314, 316 visible in right image may be blocked by the foreground obstruction 318 in left image. In this situation, the pixels may not be able to match in both images, so their disparities may also be uncertain.

The accuracy of a depth map may be influenced by the displacement between two cameras (D) FIG. 2 214. A larger displacement may be able to measure a more distant object with higher accuracy. But it may also increases the risk of occlusion by a foreground object.

A light field camera, also known as plenoptic camera, captures not only the light intensity of the scene but also the direction of the light rays entering the aperture. In contrast, a traditional camera averages the different directions of light on the image sensor plane and records only the light intensity.

One type of plenoptic camera design uses an array of micro-lens placed between the main lens and the image sensor. Each micro-lens covers multiple pixels and separates the light from main lens to these pixels based on the direction of the light. In this way, each pixel sees only a part of the main lens or in other words, a certain input angle range of the light rays reaches the aperture. With such design, a plenoptic camera sacrifices spatial resolution for angular resolution. Post-processing algorithms allow a plenoptic camera to recover 3D information of a scene and may be refocused to any distance after the image is captured.

However, there are two main factors which limit the commercial application of plenoptic cameras. The first factor is that to capture a color plenoptic image, the pixels on the sensor array apply different color filters. These color filters further reduce the spatial resolution. Another factor is the low light signal to noise ratio (SNR). Since each pixel receives only part of the input light, the plenoptic camera receives a lower input signal comparing to a traditional camera. The low SNR also reduces the accuracy of pixel matching in low light conditions.

In 3D recovery applications, the plenoptic camera does not demonstrate occlusion problems because the light is coming from a single main lens. In this situation the plenoptic image has both vertical and horizontal disparity, which may allow a high confidence match for both vertical and horizontal edges. However, because the maximum baseline is constrained to the main lens's entrance pupil size, the plenoptic camera may reach high depth resolution for close range objects.

In the instant disclosure, the camera system comprises two cameras placed side by side: a main camera having high-resolution and auto focus lens and a sub camera which is a simplified plenoptic mono-camera. In this simplified plenoptic design, each micro-lens covers 2×2, 3×3 pixels or the like. The main lens of the assistant camera may use a fixed focal length lens with a large aperture to increase both the base-line of plenoptic camera and the low light sensitivity.

Figure 4:
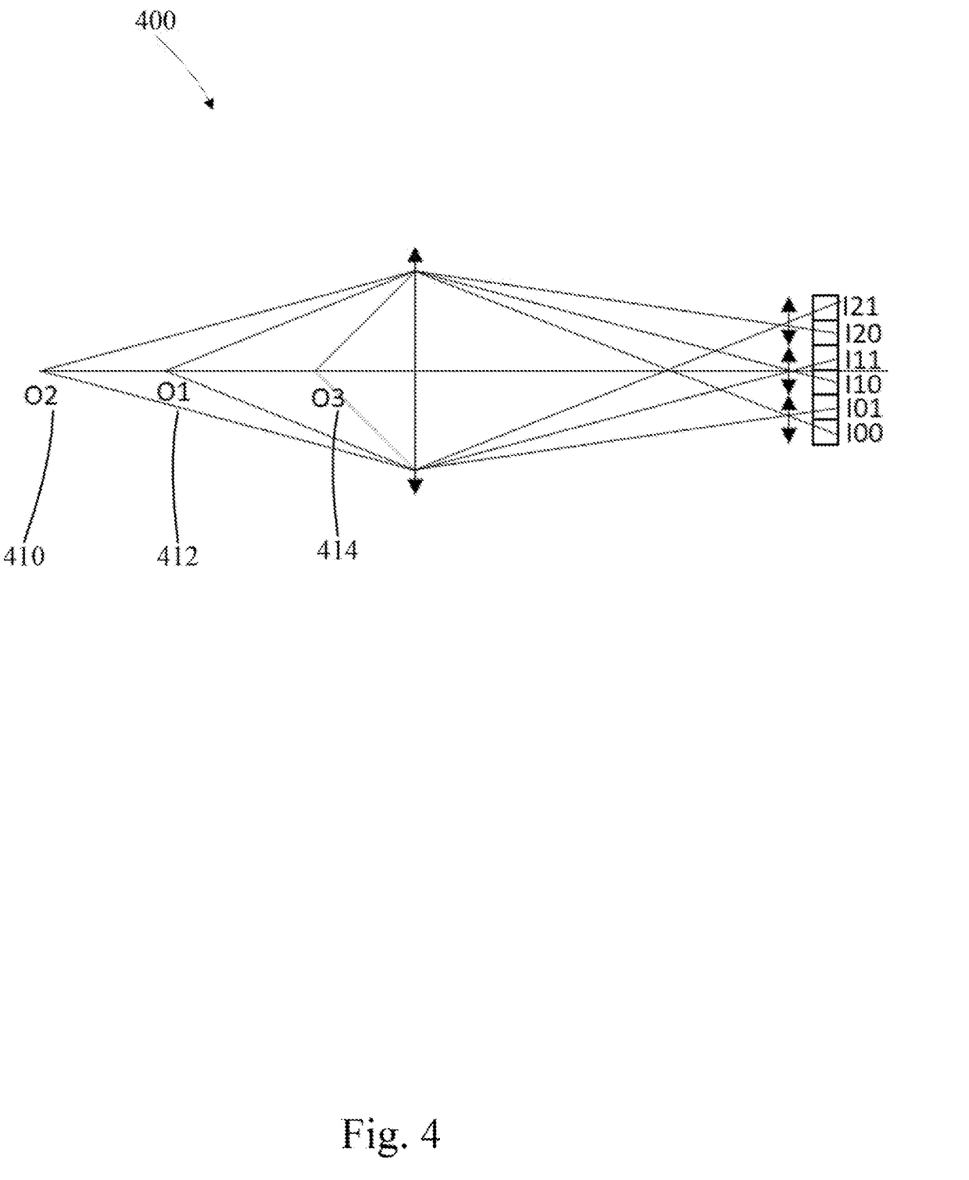
FIG. 4 is a depiction of a simplified plenoptic camera layout in accordance with one embodiment of the disclosure.

As shown in one embodiment in FIG. 4, the sensor array may be covered with an array of micro-lens covering 2×2 pixels. FIG. 4 depicts the light rays from three different objects (O1, O2 and O3) and the resulting disparities in one dimension.

In this embodiment the light from object point O1 412 is focused directly onto the micro-lens array, so that the light from the upper-half of main lens will reach pixel I10 and the light from the lower-half of main lens will reach pixel I11.

The light from object point O2 410 is focused in front of the micro-lens array so that the light from the upper-half of main lens will reach pixel I21 and light from lower-half of main lens will reach pixel I00.

The light from object O3 414 is focused behind the micro-lens array, the light from the upper-half of main lens will reach pixel I20 and the lower-half of main lens will reach pixel I01.

From the 6 pixels, we can extract two sub-images: [I00, I10,I20] and [I01,I11,I21]. The projection of O1 in these two sub-images has zero disparity in the coordinates (I10-I11), the projection of O2 in these two sub-images has negative disparity (I00-I21), and the projection of O3 in these two sub-images has a positive disparity (I20-I01).

Figure 5:
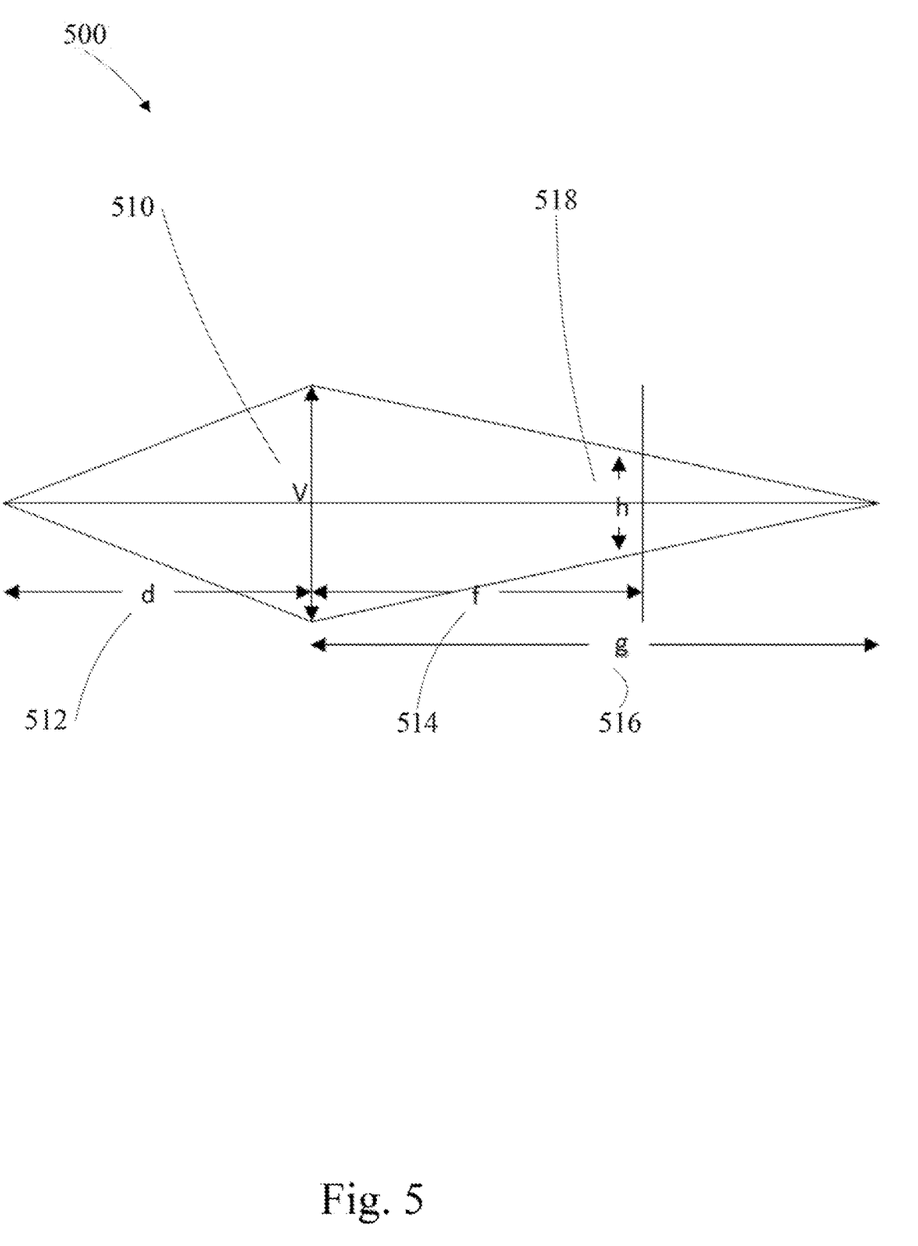
FIG. 5 is a disparity versus geometric relationship in accordance with one embodiment of the disclosure.

FIG. 5 depicts the geometric relationship between the disparity and the object distance. If a point object at distance (d) 512 forming an out-of-focus image on the sensor plane, the image size (h) 518 may be calculated from lens focal length (F), the distance from lens to sensor plane (f) 514 and lens aperture size (V) 510.

From triangular similarity, $$\frac{h}{V} = \frac{g-f}{g} = 1 - \frac{f}{g}$$

And based on the lens equation, $$\frac{1}{F} = \frac{1}{d} + \frac{1}{g}$$

Results in the equation, $$\frac{h}{V} = 1 + f\left(\frac{1}{d} - \frac{1}{F}\right) \text{ or } \frac{1}{d} = \frac{1}{F} + \frac{1}{f}\left(\frac{h}{V} - 1\right)$$

Let objects at distance D be focused on the image plane, we will have $$\frac{1}{F} = \frac{1}{D} + \frac{1}{f}$$

from the lens equation and then we can get $$\frac{1}{d} = \frac{h}{V}\left(\frac{1}{F} - \frac{1}{D}\right) + \frac{1}{D}$$

Figure 6:
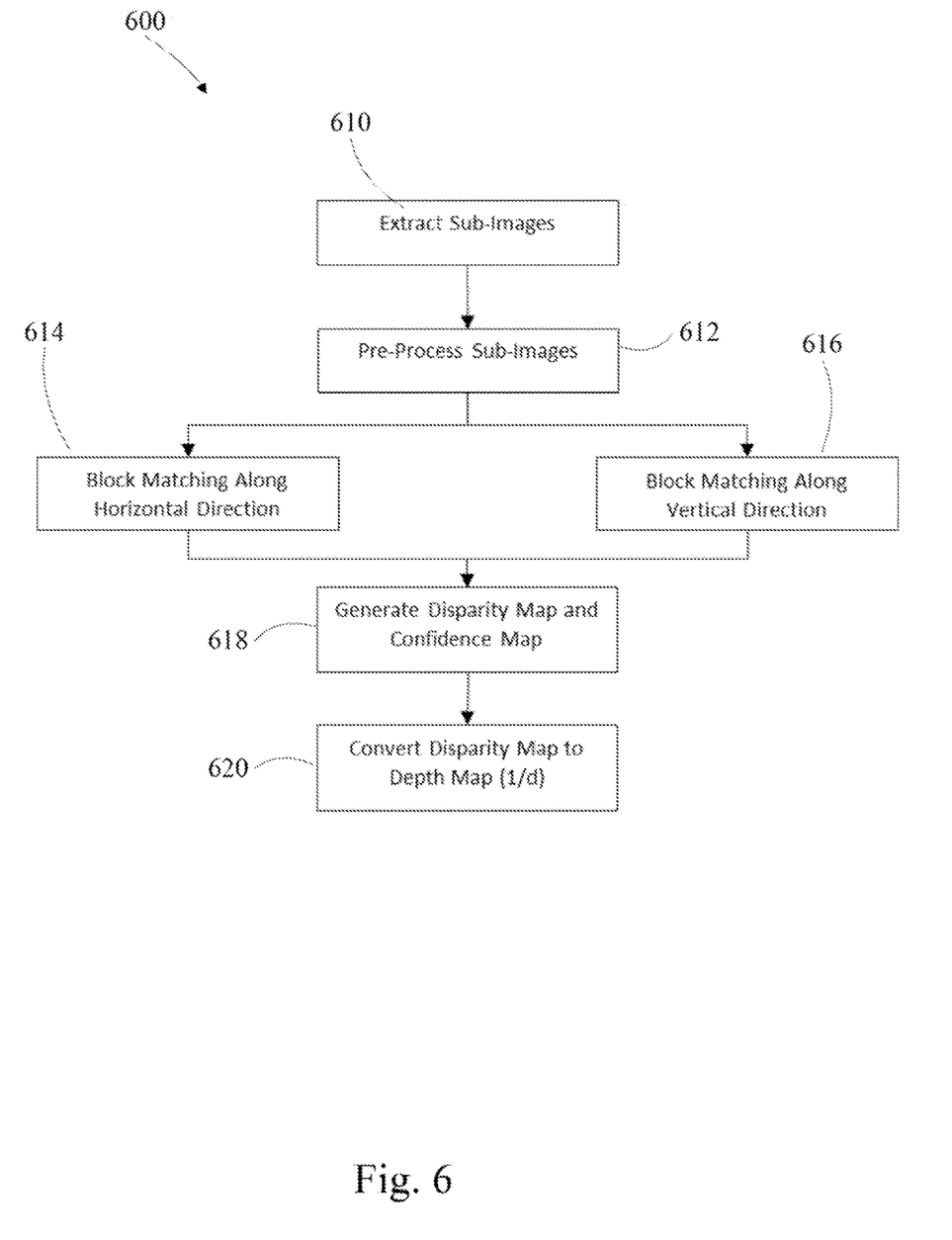
FIG. 6 is a first flow diagram of depth recovery in a plenoptic system in accordance with one embodiment of the disclosure.

FIG. 6 depicts one embodiment of the algorithm's processing flow to recover depth from a plenoptic camera. The algorithm comprises receiving an auto focus image from an auto focus camera module, converting the auto focus image to monochrome and rectifying the converted auto focus image. It also comprises receiving 610 a fixed focus image from a plenoptic camera module, averaging 612 square sub-images from the fixed focus image and rectifying the averaged sub-images. At this point the algorithm horizontally block matches 614 the rectified auto focus image and the rectified sub-image in a horizontal direction and vertically block matches 616 the rectified auto focus image and the rectified sub-image in a vertical direction. The algorithm then determines a composite block matching error of the vertical block match of the rectified auto focus image and the rectified sub-image and the horizontal block match of the rectified auto focus image and the rectified sub-image. It also determines a disparity map 618 of the rectified sub-image based on the horizontal block match error and the vertical block match error and converts 620 the disparity map into a depth map.

In the pre-processing of the sub-images, artifact pixels are removed, the noise level is reduced and the lens's geometric distortion is reduced. Block matching algorithms may be applied on an image level directly or on an image's horizontal and vertical gradients. Based on the matching error a disparity and confidence map may be generated. The disparity at one pixel in the disparity map is the displacement having the least matching error in the horizontal and vertical directions.

The unit of disparity map is calculated in pixels. Thus, based on the pixel size, a conversion of the unit of disparity may be made to a physical distance unit (mm). If the pupil size (V), the focal length (F) and focus plane distance (D) are known, a conversion may be made between the disparity map to a depth map (1/d). With respect to these parameters, a pixel size and a focal length may be found in the specification of a camera module. D and V may then be calibrated during the manufacturing of the plenoptic camera.

The calibration of plenoptic camera may be done in two steps: in the first step, a planar chart (for an example, checkboard pattern) may be put at a distance of D from the camera. The distance may be adjusted between the lens and sensor plane to nullify the disparity.

In the second step, another planar chart (for an example, array of circles pattern) may be put at another distance (d) from the camera. Based on the disparity of features on the chart and the distance of chart d, the pupil size V may be calculated.

Since plenoptic cameras only achieve robust depth resolution at a close range, the depth resolution in middle and far ranges may be achieved by a stereoscopic depth map recovering algorithm.

In one embodiment a partially accurate depth and confidence map from the plenoptic camera may be used to guide the disparity search in stereoscopic matching to reduce the chance of miss-matching caused by occlusions and repeating patterns.

In one example of a stereo setup the dual cameras are one auto-focus color camera and one fixed-focus monochromatic plenoptic camera. An average image of four sub-images extracted from the plenoptic camera are utilized as one input of the stereo matching and another input of stereo match is provided by the auto-focus color camera. A plenoptic depth map may be determined based on matching of the four extracted sub-images from the plenoptic camera. The stereo matching is then not a blind search but is a guided search based on the plenoptic depth map.

For an example, in a traditional stereo matching algorithm, for each pixel, a search is performed over a very large disparity range to cover the depth from closest distance to infinity. In this example the depth map from plenoptic camera may provide a rough estimate of the disparity in stereo. This may limit the stereo search to a small range near the rough estimate which reduces the risk of miss-matching caused by the stereo matching.

Figure 7:
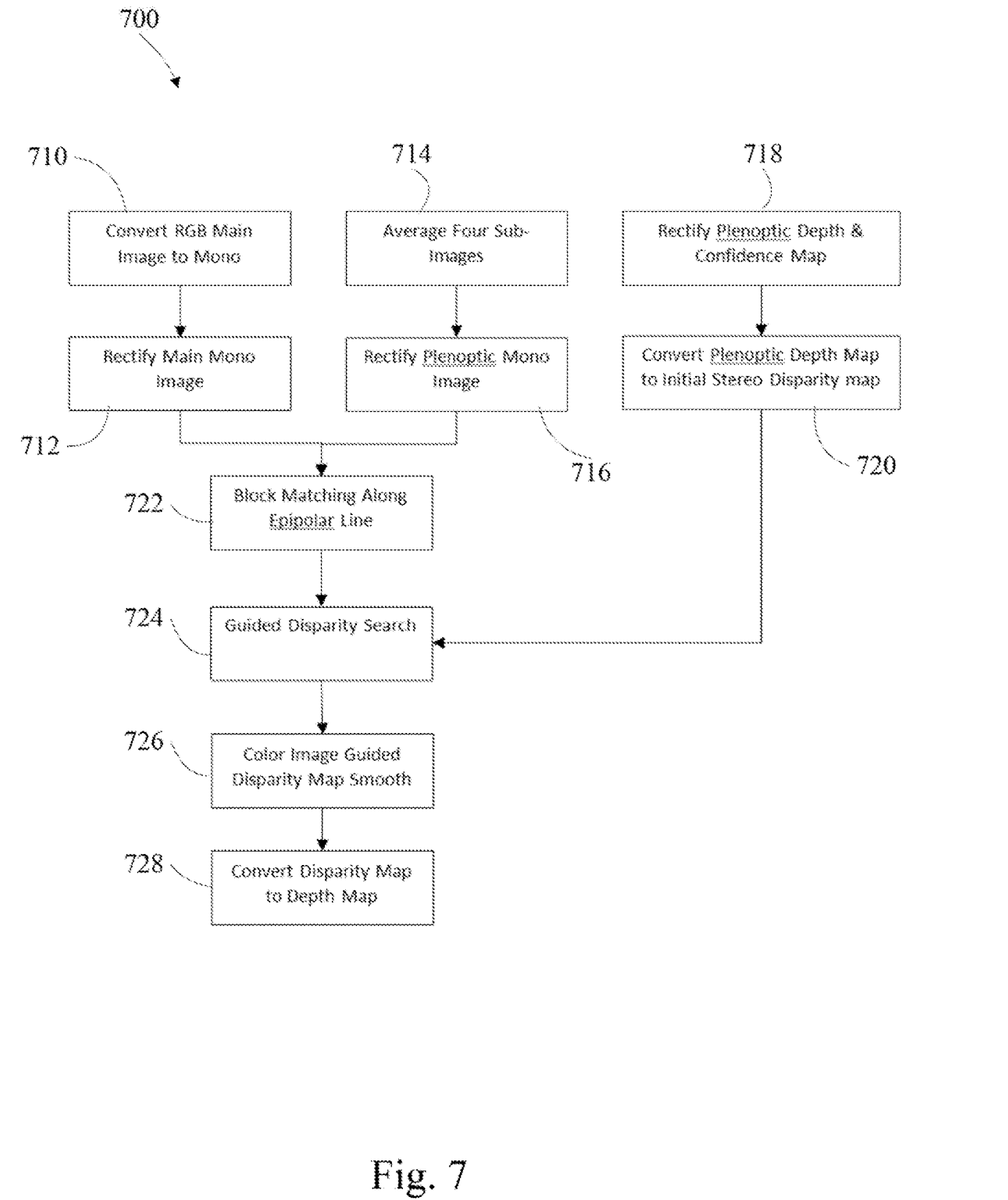
FIG. 7 is a second flow diagram of recovery of a stereoscopic depth map guided by a plenoptic depth map in accordance with one embodiment of the disclosure.

FIG. 7 depicts one embodiment of the stereo depth recovery algorithm processing flow. In this embodiment the main camera image is converted to black and white 710 and the image is rectified 712. In the plenoptic sub camera a 2×2 pixel sub-image is averaged 714 and rectified 716 and block matching 722 is performed along epipolar lines within the main camera image and the plenoptic sub camera image. The plenoptic depth and confidence maps are rectified 718 and the plenoptic depth map is converted 720 to an initial stereo disparity map which is used along with the block matching 722 in a guided disparity search 724. The color image disparity map is smoothed 726 and the disparity map is converted 728 to a depth map.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of real-time depth mapping in a dual camera system, comprising:
   receiving an auto focus image from an auto focus camera module;
   converting the auto focus image to monochrome;
   rectifying the converted auto focus image;
   receiving a fixed focus image from a plenoptic camera module having lens that cover two by two pixels and outputting a plurality of plenoptic sub-images;
   extracting four plenoptic sub-images from the plurality of plenoptic sub images;
   averaging the extracted plenoptic sub-images;
   rectifying the averaged plenoptic sub-images;
   block matching the rectified auto focus image and the rectified plenoptic sub-images along epipolar lines, outputting an epipolar block match;
   block matching the rectified plenoptic sub-images along a vertical direction, outputting vertical plenoptic block match;
   block matching the rectified plenoptic sub-images along a horizontal direction, outputting horizontal plenoptic block match;
   determining a composite block matching error of the vertical plenoptic block match and the horizontal plenoptic block match;
   determining a plenoptic disparity map of the extracted plenoptic sub-images based on the composite block matching error,
   converting the plenoptic disparity map to a plenoptic depth map;
   converting the plenoptic depth map to an initial stereo disparity map;
   searching for a guided disparity map based on the initial stereo disparity map and the epipolar block match; and
   converting the guided disparity map to a guided depth map.

2. The method of real-time depth mapping in the dual camera system of claim 1, further comprising determining a plenoptic confidence map of the extracted plenoptic sub-images based on the composite block matching error.

3. The method of real-time depth mapping in the dual camera system of claim 1, further comprising receiving a color image from the auto focus camera module.

4. The method of real-time depth mapping in the dual camera system of claim 3, further comprising smoothing the guided disparity map.

5. The method of real-time depth mapping in the dual camera system of claim 4, further comprising converting the smoothed guided disparity map to a smoothed depth map.

6. The method of real-time depth mapping in the dual camera system of claim 1, wherein the block matching is performed in the horizontal direction.

7. The method of real-time depth mapping in the dual camera system of claim 6, wherein the block matching is performed in the vertical direction.

8. The method of real-time depth mapping in the dual camera system of claim 7, wherein the block matching error is a composite block matching error based on the block matching performed in the vertical direction and the horizontal direction.

9. The method of real-time depth mapping in the dual camera system of claim 8, further comprising:
determining a disparity map of the rectified plenoptic sub-images based on the horizontal block matching error and the vertical block matching error; and
converting the disparity map to a depth map.

10. A dual camera system having real-time depth map generation, comprising:
an auto focus camera module outputting an auto focus image;
a monochromatic plenoptic camera module, wherein a plenoptic lens cover two by two pixels, outputting a plurality of plenoptic sub-images, wherein the plenoptic camera module is fixed focus;
a processor coupled to the auto focus camera module and the plenoptic camera module, wherein the processor;
converts the auto focus image to monochrome;
rectifies the converted auto focus image;
extracts four plenoptic sub-images from the plenoptic camera module;
averages the four plenoptic sub-images from the plurality of plenoptic sub-images;
rectifies the averaged four plenoptic sub-images; and
block matches the rectified auto focus image and the rectified four plenoptic sub-images along epipolar lines.

11. The dual camera system having real-time depth map generation of claim 10, wherein the processor further
extracts four plenoptic sub-images from the plurality of plenoptic sub-images;
block matches the four plenoptic sub-images along a vertical direction, outputting a vertical plenoptic block match;
block matches the four plenoptic sub-images along a horizontal direction, outputting a horizontal plenoptic block match;
determines a composite block matching error of the vertical plenoptic block match and the horizontal plenoptic block match;
determines a plenoptic disparity map of the four plenoptic sub-images based on the composite block matching error;
determines a plenoptic confidence map of the four plenoptic sub-images based on the composite block matching error, and
converts the plenoptic disparity map to a plenoptic depth map.

12. The dual camera system having real-time depth map generation of claim 11, wherein the processor further
converts the plenoptic depth map to an initial stereo disparity map;
searches for a guided disparity map based on the initial stereo disparity map;
smoothes the guided disparity map; and
converts the guided disparity map to a guided depth map.

13. The dual camera system having real-time depth map generation of claim 12, wherein the processor further smoothes the guided depth map.

14. The dual camera system having real-time depth map generation of claim 13, wherein the guided disparity map is determined from a displacement having a smallest matching error based on the block matches.

15. A dual camera stereo system having real-time depth map generation, comprising:
an auto focus camera module outputting an auto focus image;
a monochromatic plenoptic camera module, wherein a plenoptic lens cover two by two pixels and outputs a plurality of plenoptic sub-images and wherein the plenoptic camera module is fixed focus;
a processor coupled to the auto focus camera module and the plenoptic camera module, wherein the processor;
extracts four plenoptic sub-images from the plurality of plenoptic sub-images;
block matches the four plenoptic sub-images along a vertical direction, outputting a vertical plenoptic block match;
block matches the four plenoptic sub-images along a horizontal direction, outputting a horizontal plenoptic block match;
determines a composite block matching error of the vertical plenoptic block match and the horizontal plenoptic block match;
determines a plenoptic disparity map of the four plenoptic sub-images based on the composite block matching error;
determines a plenoptic confidence map of the four plenoptic sub-images based on the composite block matching error; and
converts the plenoptic disparity map to a plenoptic depth map.

16. The dual camera stereo system having real-time depth map generation of claim 15, wherein the processor further:
converts the auto focus image to monochrome;
rectifies the converted auto focus image;
averages the four plenoptic sub-images;
rectifies the averaged four plenoptic sub-images;
block matches the rectified auto focus image and the rectified four plenoptic along epipolar lines;
converts the plenoptic depth map to an initial stereo disparity map;
searches the auto focus image based on the initial stereo disparity map in a guided disparity search outputting a guided disparity map; and
converts the guided disparity map to a guided depth map.

17. The dual camera stereo system having real-time depth map generation of claim 16, wherein the processor further smoothes the guided disparity map.

18. The dual camera stereo system having real-time depth map generation of claim 17, wherein the processor further converts the smoothed guided disparity map to a smoothed depth map.

19. The dual camera stereo system having real-time depth map generation of claim 16, wherein the guided disparity map is determined from a displacement having a smallest matching error based on the block matches.

* * * * *